United States Patent Office 3,376,931
Patented Apr. 9, 1968

3,376,931
METHOD OF TREATING SOUR RESERVOIRS
Joseph U. Messenger, Dallas, Tex., assignor to Mobil Oil Corporation, a corporation of New York
No Drawing. Filed July 11, 1966, Ser. No. 564,015
4 Claims. (Cl. 166—42)

This invention relates to the treatment of sour reservoirs, from a well penetrating the same, to improve the production of hydrocarbons, and more particularly for this purpose, it relates to the removal of elemental sulfur from the formation matrix of the reservoir adjacent such well.

There are certain sour reservoirs which contain in the formation matrices free or elemental sulfur that restricts the production of hydrocarbons. These reservoirs, usually of limestone, can contain hydrogen sulfide gas in the amounts of 10 to 40 volume percent of the produced hydrocarbons. When these reservoirs produce fluids through a well, the elemental sulfur dissolved in gases migrates through the formation matrices. At some location near the well, sulfur precipitates from these gases to plug or reduce the permeability to fluids of the formation. Additionally, the sulfur may precipitate within the well so as to plug the conduits carrying hydrocarbons to the earth's surface. The precipitation of the sulfur from solution is the result of changes in pressure and temperature of the reservoir gases. In any event, the migration of elemental sulfur under these circumstances causes severe production problems in sour reservoirs.

In many cases, it is desirable to acidize the sour reservoirs, usually where the formations are limestone or dolomite, so as to increase the production of hydrocarbons. Under these conditions the carbonate matrices are dissolved. The acidizing also deposits free sulfur in the voids created by its leaching action. Such sulfur is readily moved by formation fluids. Under these circumstances, it is even more important to provide a method for preventing this elemental sulfur from being deposited as a solid material adjacent to and also in the well.

It has been suggested, in the past, to use carbon disulfide as a washing liquid for removing solids, which may include sulfur, from well conduits, and the adjacent formation, of reservoirs. However, carbon disulfide has several deficiencies which include a high cost, high inflammability, very toxic vapors, and rather high vapor pressure. These physical factors make the use of this material expensive for removing sulfur and also very hazardous to field personnel.

It is therefore an object of this invention to provide a method for removing the sulfur from a well, and the adjacent formation, in a sour reservoir without the problems associated with using carbon disulfide.

In accordance with the method of this invention, a peroleum-producing formation containing hydrogen sulfide gas and elemental sulfur is treated through a well which penetrates thereinto by the introduction of an aqueous solution of a material which will dissolve the free sulfur, in substantial amounts per unit volume, and then can be coproduced with the fluids from the formation throug hthe well. By this means, the elemental sulfur residing in the formation adjacent to, and in, a well is removed as a liquid; and thereby it cannot reduce the permeability to fluids in either the formation or plug the well.

More particularly, for purposes of this invention, an aqueous solution of an ammonium sulfide material is introduced through the well into the formation. The ammonium sulfide material includes one or more of the several compounds formed by the reaction in aqueous environments between ammonium and sulfide ions. These compounds usually are diammonium sulfide, ammonium hydrosulfide, ammonium polysulfide and solutions of such compounds with elemental sulfur.

The aqueous solution of ammonium sulfide materials is preferably prepared at the well site by the intermixing of aqueous ammonia with hydrogen sulfide. The hydrogen sulfide may be secured from a well producing the formation fluids. Ammonia, or ammonium hydroxide, in any form, may be intermixed with the hydrogen sulfide, in water, under suitable conditions of pressure and temperature to form diammonium sulfide, and then the more stable decomposition product thereof, ammonium hydrosulfide. The ammonium hydrosulfide has a vapor pressure of 748 millimeters at 32° C. but it is very soluble in water to form usable solutions. Although the anhydrous vapors of the ammonium sulfide material are toxic, when placed into water solutions they are relatively safe to handle. Also the aqueous solutions are noninflammable.

The concentration of the ammonium sulfide material in the aqueous solution is not critical and can be adjusted to the amount needed to dissolve a selected amount of the sulfur through a given radial dimension of the formation about the well. For example, it may be desired to introduce such quantity of an aqueous solution ammonium sulfide material as to dissolve most sulfur in the formation at a radius of about 3 to 5 feet around the well. From a core sample of the formation, this amount of ammonium sulfide material in aqueous solution can be readily determined. Generally, clearing the formation for a radius greater than 25 feet from the well is not necessary.

The aqueous solution of ammonium sulfide material readily dissolves great quantities of free sulfur. The resulting product is commonly termed "an ammonium polysulfide." As much as 8 or 9 mols of sulfur may be dissolved per each mol of the ammonium sulfide material.

Preferably, the aqueous solution of ammonium sulfide is introduced as a slug, or bank, of liquid solution through the well into the formation. This is an advantage that should the formation be priorly acid-treated or fractured, the aqueous solution will miscibly displace the acid back away from the well and thereby prevent a reaction between the acid and the aqueous solution of ammonium sulfide material. If desired, a slug of inert fluid, such as water, may be introduced immediately prior to the aqueous solution of ammonium sulfide material.

The aqueous solution of ammonium sulfide material may be introduced via the well into the formation by any suitable means such as by pumping it under pressure, or using a driving slug of displacing fluid behind such solution.

Preferably, the injection of the aqueous solution of ammonium sulfide material occurs after an acid treatment. The acid treatment, usually practiced with a strong mineral acid, such as hydrochloric, is introduced into the formation for opening the pore spaces of the formation encountered in the sour reservoir. This acid may be displaced outwardly into the formation by the aqueous solution of ammonium sulfide material. Alternatively, the acid mixture may be reproduced back through the well after its injection before introduction of this material.

After the aqueous solution of ammonium sulfide material has been introduced into the formation via the well, it is maintained in place as a liquid about the well until a substantial amount of the free sulfur is dissolved from the formation matrices. Since the solution of sulfur in the aqueous solution is very rapid, this may be only a short period of time, as for example, 3 to 4 hours of duration. This solution effect is enhanced since the aqueous solution is maintained in a liquid phase throughout the procedure.

After dissolving substantial quantities of the free sulfur in the formation adjacent the well, the well is then arranged to produce fluids from the formation. By this means, the sulfur, carried in solution as ammonium polysulfide, is removed from the formation through the well to the earth's surface. The ammonium sulfide material may be processed at the earth's surface to recover the free sulfur and ammonium sulfide material which then may be recycled in the procedure, if desired.

By the means of the preceding steps, it will be seen that the elemental sulfur in the formation matrices of sour reservoirs is removed through the well and thereby prevents the free sulfur from migrating toward the well and reducing the permeability to fluids in the formation which surround the well.

The method of this invention achieves its stated objects and provides for a safe method of removing free sulfur from a formation which surrounds a well. It will be apparent that the aqueous solution of ammonium sulfide material employed can be readily prepared in the field from the hydrogen sulfide produced from the well; also it will be less expensive than the carbon disulfide previously employed. An aqueous liquid phase of this material is safe to handle from the standpoint of the operation personnel's safety.

The foregoing description of the present invention is by way of illustration and not of limitation. The only limitations to the present invention are contained in the following claims.

What is claimed is:

1. In a method of treating a petroleum-producing formation containing hydrogen sulfide gas and free sulfur in the matrices, which formation is penetrated by a well, the steps comprising:
    (a) introducing in a liquid phase via the well into the formation an aqueous solution of ammonium sulfide material,
    (b) maintaining the aqueous solution as a liquid in place in the formation about the well until a substantial amount of the free sulfur is removed from the formation matrices by dissolving in said aqueous solution to form ammonium polysulfide, and
    (c) producing fluids from said formation via the well whereby the free sulfur adjacent the well in the formation is removed as a liquid and thereby cannot reduce the permeability to fluids of the formation adjacent the well.

2. The method of claim 1 wherein the formation is acidized prior to practice of steps (a), (b), and (c).

3. The method of claim 2 wherein an inert slug of a miscible buffer fluid is injected after said acid and immediately before said aqueous solution.

4. The method of claim 2 wherein said inert slug is water.

References Cited

UNITED STATES PATENTS

| | | | |
|---|---|---|---|
| 461,431 | 10/1891 | Frasch | 299—5 |
| 1,809,546 | 6/1931 | Bowman | 166—38 |
| 3,070,162 | 12/1962 | Barnard | 166—44 X |
| 3,160,206 | 12/1964 | Jorda | 166—42 X |
| 3,326,289 | 6/1967 | Mulder | 166—42 |

STEPHEN J. NOVOSAD, *Primary Examiner.*